9028X
T. V. Leroy, Forge,
No Printed Specification Availab
Patented Aug. 17, 1835
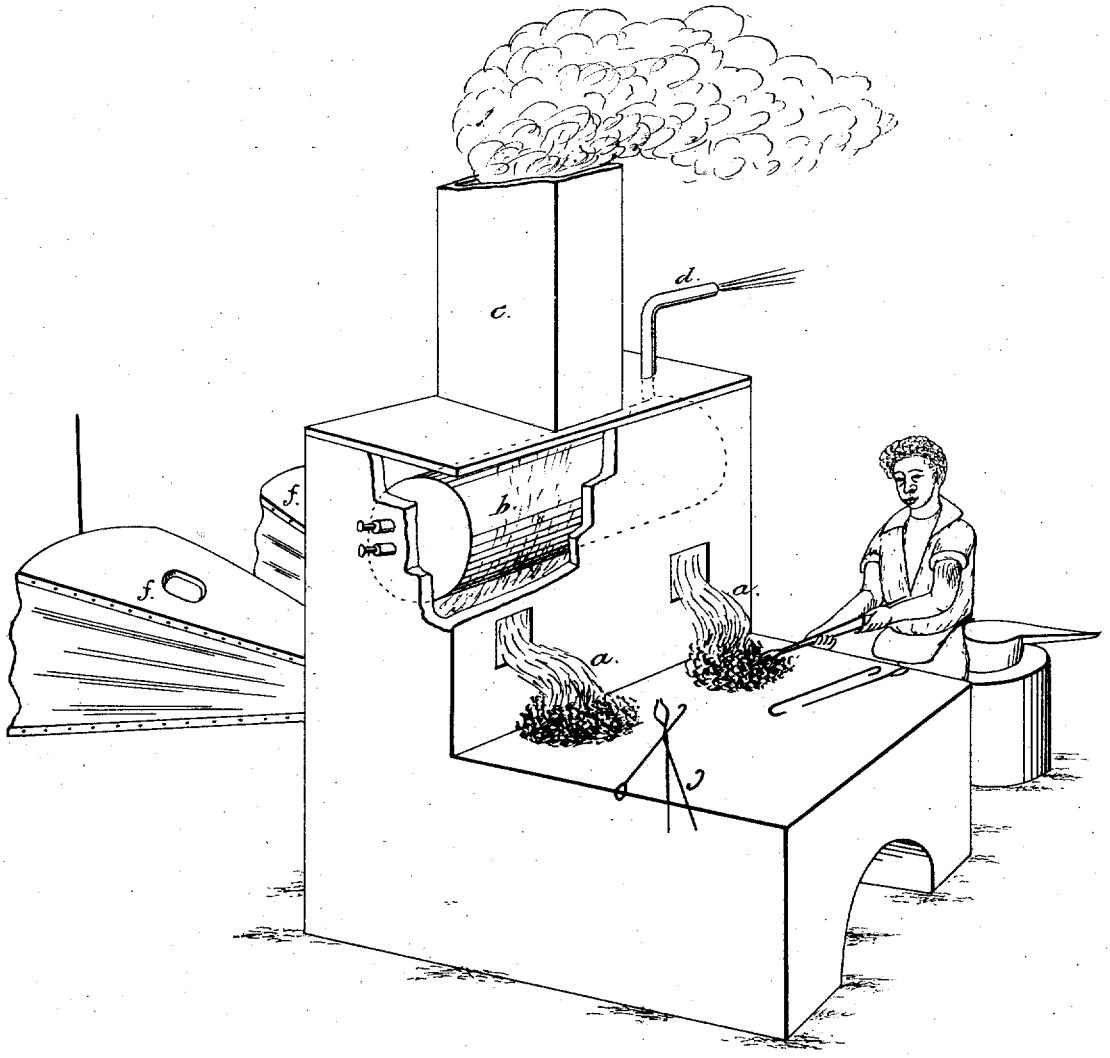
N. PETERS, PHOTO-LITHOGRAPHER, WASHINGTON, D. C.

9028X Aug. 17, 1835 [illegible]

Junis V. Leroy, of Newport. State. New York.

Letters Patent.

The schedule referred to in these Letters Patent and making part of the same containing a description in the words of the said Junis V. Leroy himself of his improvement in the use and application of fire or heat heretofore lost in the generation of Steam, To all to whom these presents shall come.

Be it known that I Junis V. Leroy of New port in the county of Herkimer and State of New York, have invented a new and useful improvement in the economy, use and application of fire or heat in the generation of Steam or Steam power, to opperate a Steam engine to drive any machinery which may be attached to such engine and the following is a full and exact description of such improvement in the economy, use and application of such fire or heat in the generation of such Steam or Steam power and is intended to be applied to practical use, and may be applied to practical use in the coal fires of Black-smiths shops, Gun smiths, Lock smiths, Anchor shops, Engine shops, Iron forges, and all such coal fires as are now commonly used for heating, welding, fusing, or melting iron or other metals or substances, for the purpose of blowing the bellows to such fires and opperating a common steam engine to drive such machinery as may be desired & to which such power may be adequate or sufficient, Set a common steam boiler of any suitable construction, size and shape in brick or other convenient materials so that it shall be in contact with the coal fires or heat used for heating or fusing iron or other metals or substances and attach to such boiler a common steam engine of such strength and size as may be required for the purpose for which it is intended to be used and the heat of each coal fires commonly used for heating or melting or fusing iron or other metals or substances.

[illegible]

170. 9028X applied to such steam boilers generating steam or steam power in propor-
tion to the quantity of coal used in such fires. which power may be
applied to the blowing of the bellows for the same fires or for driving
any machinery to which steam power is applicable and to which the
power of the steam thus generated may be adequate, What I claim
as my own discovery or invention and not previously known is the
economizing and using the heat heretofore escaping without use
from such coal fires as are now commonly used for heating, melting
or fusing iron or other metals or substances by placing a common
steam boiler of suitable common construction size & shape so that
it shall be in contact with the coal fires or heat, now used for
heating, melting or fusing iron or other metals or substances so as
to generate steam or steam power by such fires or the heat there
of escaping heretofore without use, and attaching to such boiler
in the manner now commonly used, a common steam engine
suitable for the purposes for which it is designed to be used, and such
engine may be used for any purposes for which stationary steam
engines are now used, & to which the power thus obtained by
generating steam by such fires, may be adequate and sufficient
Dated at Newport N. Y. 6th of June 1835.

Witnesses
Jeremiah Cory
Ebenz Knapen

Tunis V. Leroy